C. P. MARYE.
METHOD OF MANUFACTURING NUTS.
APPLICATION FILED MAY 29, 1914. RENEWED MAY 25, 1916.
1,210,509.
Patented Jan. 2, 1917.
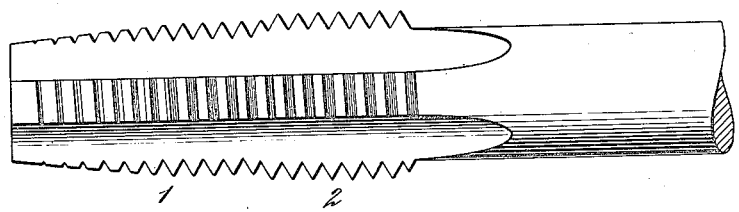
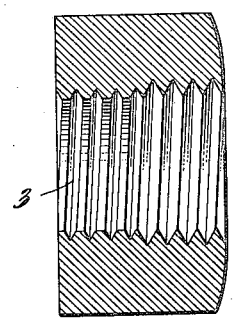
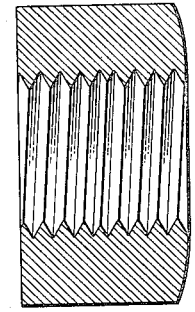
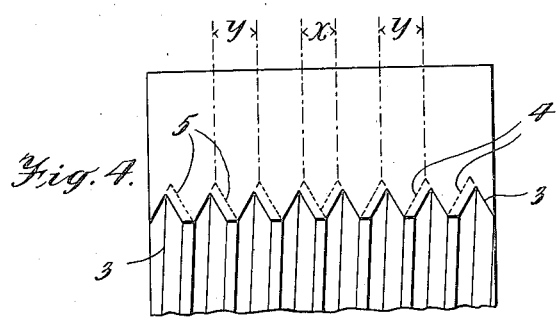
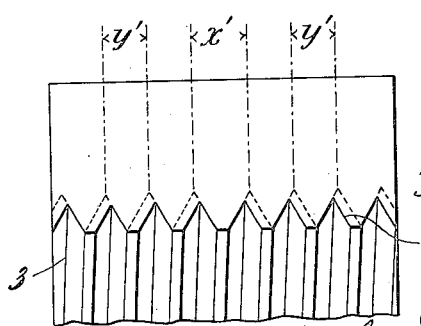
Witnesses:
Inventor
Clifford P. Marye
By his Attorneys

UNITED STATES PATENT OFFICE.

CLIFFORD P. MARYE, OF SOUTH WHITLEY, INDIANA, ASSIGNOR OF ONE-THIRD TO WILLIAM A. ROSENBAUM, TRUSTEE, OF NEW ROCHELLE, NEW YORK.

METHOD OF MANUFACTURING NUTS.

1,210,509.	Specification of Letters Patent.	Patented Jan. 2, 1917.

Application filed May 29, 1914, Serial No. 841,763. Renewed May 25, 1916. Serial No. 99,919.

*To all whom it may concern:*

Be it known that I, CLIFFORD P. MARYE, a citizen of the United States, residing at South Whitley, in the county of Whitley and State of Indiana, have invented certain new and useful Improvements in Methods of Manufacturing Nuts, of which the following is a full, clear, and exact description.

This invention is a method of manufacturing nuts of the character described in my application for patent filed March 24, 1913, Serial No. 756,282, the object of the invention being primarily to provide a method whereby the cost of manufacturing these nuts will be small.

The nut referred to in my said application for patent is one which is capable of retaining itself upon its bolt, making all extraneous locking devices unnecessary.

The nut consists essentially of a solid structure provided with a continuous thread from one end to the other of its bore, the thread comprising two sections, one succeeding the other, and each extending approximately one-half way through the bore of the nut. The thread is of uniform character throughout, but one section thereof is bodily offset from the other in an axial direction a slight distance amounting to a mere fraction of the width of one thread, thus bringing the threads of the two sections slightly out of helical alinement, whereby a nut will screw freely over the bolt until the threads on the latter encounter the second section of thread in the nut, whereupon friction will be developed between the threads of the nut and those of the bolt sufficient to prevent the turning of the nut without the application of considerable force; such force is necessary to be exercised through a wrench in order to set the nut up to its work, and thereafter the friction will be sufficient to prevent the nut from backing off or becoming loose.

Considerable difficulty has been experienced in devising a method of manufacturing this nut with its two offset sections of thread at a cost which renders the manufacture commercially practicable.

The present invention affords a method by which the cost of production is very little if any more than that of the ordinary nut. This method will now be described with reference to the accompanying drawing, in which—

Figure 1 is a side view of a form of tap that may be used in carrying out my method; Fig. 2 is a central section of a nut at one stage of its manufacture; Fig. 3 is a similar section of the nut in its completed condition. Figs. 4 and 5 are diagrams illustrating how the threads may be cut.

The tap which I prefer to use in carrying out this method and which is illustrated in Fig. 1, is provided at its forward end with a section 1 of cutting threads having the same pitch as the thread of the finished nut but adapted to cut only a shallow unfinished thread. This advance section of thread on the tap is immediately followed by a second section 2 of the same pitch as section 1, but adapted to cut deeper and to finish the threading operation. This second section 2 of the tap is bodily offset in an axial direction from the section 1 a distance equal to a small fraction of the width of one thread, so that the thread of section 2 will be slightly out of helical alinement with the thread of section 1 at the point where they collide. The offsetting of the two sections of thread on the tap may be either toward or away from each other, the form shown being that in which the two sections are offset toward each other.

The nut before it is threaded is the usual solid structure having a smooth passage extending through it. The tap of Fig. 1 is first passed into the bore of the nut, say from the right hand toward the left hand side, whereupon the advance section 1 of the tap cuts a partially finished thread throughout, such for instance as illustrated by the full lines 3 of Fig. 4, the same partial thread being illustrated at 3 in Fig. 2. The tap proceeds along the bore of the nut until the section 2 of the tap enters the nut, whereupon the deeper finished thread is cut along the passage of the nut as far as the divisional line between the two sections on the tap is allowed to enter the nut, which will ordinarily be the middle point of the nut. Inasmuch as the thread of section 2 of the tap is offset axially from the thread of section 1, and likewise from the thread in the nut, which is previously cut by the section 1, the section 2 of the tap will cut away one surface of the thread 3 to the extent of the off-setting, the cut thus made being indicated by the dotted lines 4 in Fig. 4. The completed thread thus formed by section 2 of the tap will thus have all of its peaks moved or offset toward the center of the nut the predetermined distance provided by the tap. In this first operation of the tap, the advance section 1 thereon not only makes a partial cut of the thread to lessen the work required by the section 2 of the tap, but by reason of its engagement with the walls of the nut, it compels the second section 2 of the tap to cut away one surface of the previously formed partial threads. In the absence of any engagement between the advance section of the tap and the wall of the nut, there would be a tendency of the section 2 to follow exactly along the partially cut thread and thus remove equal portions from both surfaces of that thread and producing a finished thread which would be exactly in helical alinement with the unfinished thread, which, of course, is not desired in the present instance. The next operation is to back out the tap from the nut and introduce it into the left side of the bore. In this movement, the advance section 1 of the tap runs freely along the unfinished section 3; the section 2 of the tap then follows and is again forced to cut one face from the unfinished threads as indicated by the dotted lines 5 in Fig. 4. The side of the thread cut away in this instance is opposite that cut away in the first operation, so that the peaks of this portion of the finished thread will all be advanced toward the center of the nut to an extent equal to the amount of offset of sections 1 and 2 of the tap. The tap is continued inward until its section 2 collides at the middle point of the nut with the other finished half of the thread; it is then backed out and the nut is finished as in Fig. 3. It will thus be seen that since the sections of thread in each half of the nut have both been off-set toward the middle point of the nut, the total amount of the offset of one section of thread with respect to the other in the finished nut will be equal to twice the offsetting between the sections of the tap. It is obvious, however, that in the second operation, an ordinary tap may be used which will merely finish the thread 3 cut in the first operation, by following it accurately and merely cutting deeper into the wall of the nut, in which case the total offsetting of the two thread sections would be that which was obtained in the first operation.

When the offsetting of the sections of the tap is in a direction toward each other, the convolution of thread at the middle or colliding point is reduced in width, $x$ in Fig. 4 indicating the reduced width and $y$ the normal width, and when the offsetting of the sections is in a direction away from each other, the middle convolution is left thicker than the others, $x'$, Fig. 5, indicating the thicker convolution and $y'$ the normal convolution.

The method herein described can be carried out with one or two taps of the character shown in Fig. 1, but it will be preferable to mount two of the taps in a machine and cause one of them to enter the nut from one side and the other to enter from the opposite side while the first is being withdrawn. In this way the cost of production will be but little if any more than that of the ordinary nut.

I claim:—

1. The method of forming a thread in a nut which consists in cutting an unfinished thread of uniform character throughout the bore of the nut, then cutting away one surface of the unfinished thread throughout a portion of its length and finally cutting away the opposite surface of the remainder of the unfinished thread, for the purpose set forth.

2. The method of forming a thread in a nut which consists in cutting a thread of uniform character throughout the bore of the nut then cutting away one surface of said thread throughout a portion of its length.

In witness whereof, I subscribe my signature, in the presence of two witnesses.

CLIFFORD P. MARYE.

Witnesses:
WALDO M. CHAPIN,
JOSEPH BUCKLEY.